April 4, 1950 F. S. ENTZ ET AL 2,502,837
POSITION INDICATING SYSTEM
Filed Nov. 24, 1943 4 Sheets-Sheet 2

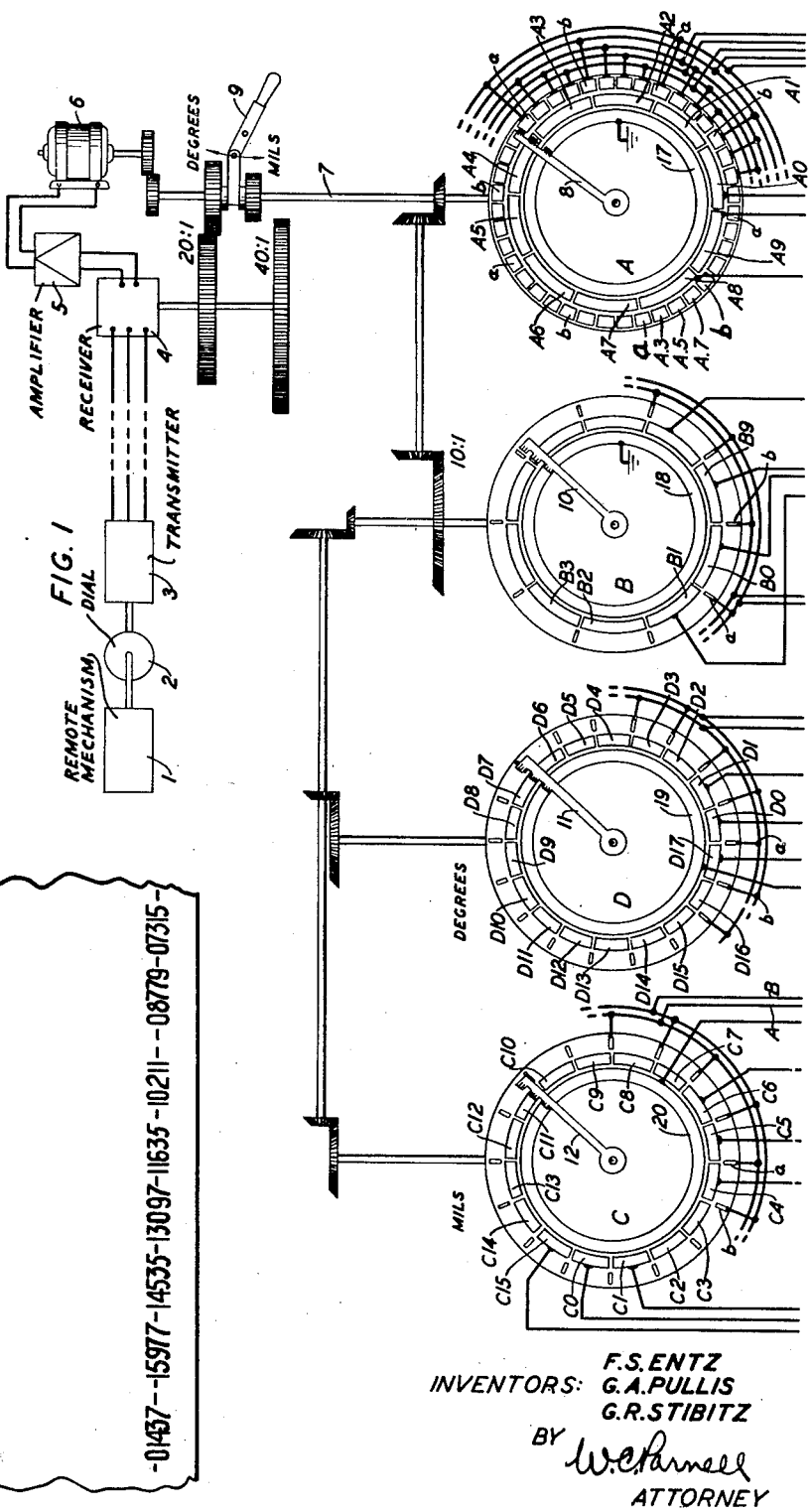

F.S. ENTZ
INVENTORS: G.A. PULLIS
G.B. STIBITZ
BY
W.C. Parnell
ATTORNEY

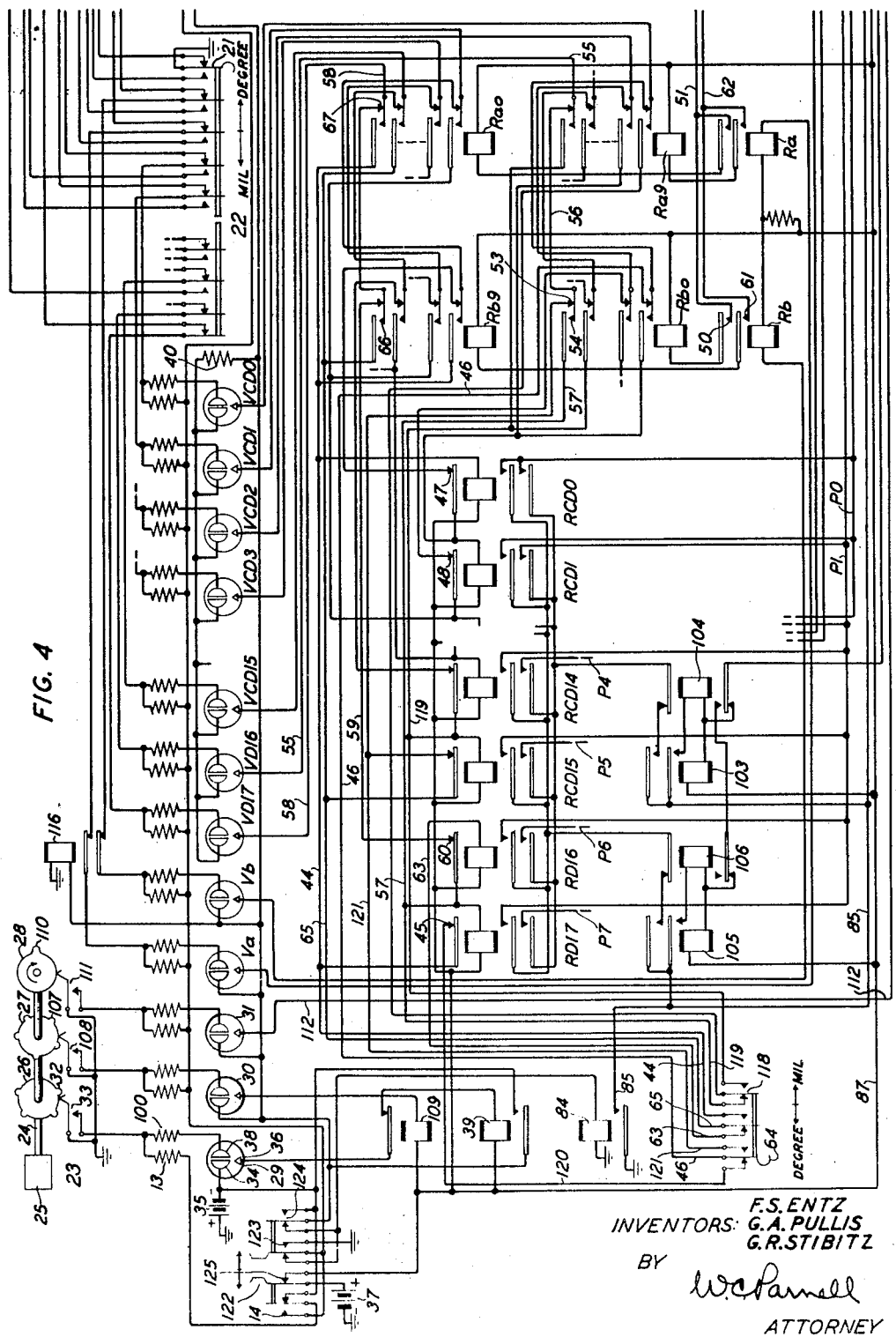

Patented Apr. 4, 1950

2,502,837

UNITED STATES PATENT OFFICE 2,502,837

POSITION INDICATING SYSTEM

Ferdinand S. Entz, Mount Kisco, and George A. Pullis, Riverdale, N. Y., and George R. Stibitz, Boonton, N. J.; said Entz and said Pullis assignors to Bell Telephone Laboratories, Incorporated, New York, N. Y., a corporation of New York, and said Stibitz assignor to the United States of America as represented by the Director of the Office of Scientific Research and Development Application November 24, 1943, Serial No. 511,582

7 Claims. (Cl. 346—33)

This invention relates to position indicating or recording systems and the object of the invention is to indicate or record automatically at frequent intervals the exact position of a moving member.

In testing and calibrating certain mechanisms wherein dials or other movable members are intended to move accurately in accordance with applied forces, it is necessary to obtain at a remote point an accurate history of the motion of the member over a considerable period of time. This is particularly difficult where the member may move in either direction at widely different velocities.

Heretofore such records have been obtained by photography but the photographic method is not satisfactory in cases where the data must be available without delay.

According to the general features of the invention a rotary motion corresponding to the motion of the remotely located member under observation is first multiplied or stepped up in any suitable manner to a value from which it may be stepped down again progressively by translating devices which set registering equipment arranged on a decimal basis in positions which represent the instantaneous positions of the remote member. The registering equipment is associated by means of suitable circuits with an indicating or recording device which is periodically energized in accordance with the settings of the registering equipment.

The translating devices may be, for example, a plurality of shafts interconnected by suitable gearing, each shaft may operate a primary register such as the brush arm of a distributor having a plurality of segments. Each segment may be associated with a secondary register, such as a gas-filled trigger tube controlling a relay which stores the instantaneous indications of the primary register and determines a number or character to be indicated or recorded by suitable printing mechanism.

In the preferred embodiment of the invention the operating cycle is initiated by means of pulses from timing mechanism and as each starting pulse is received, one tube associated with each brush, and corresponding to the position of the brush at that instant, fires and operates its relay. The number of the lowest order is printed first and through a relay train the printer mechanism is transferred to the control of the relays of higher orders successively until all the data for the position has been recorded at which time a "stop" pulse from the timing mechanism resets the system to condition it for the next printing cycle.

An important feature of the invention is the priming circuits for preventing errors in printing even though under certain conditions the tube adjacent the proper tube has been fired in error.

Other important features are means for preventing the misfiring of tubes due to leakage currents, and means for locking out all other tubes of a group as soon as one tube has fired.

A further important feature of the invention comprises switching circuits for selectively connecting one group of trigger tubes to either of two distributors having different numbers of segments whereby the position of the rotating member may be recorded in either of two measuring units.

These and other features of the invention will be better understood from the following detail description and the accompanying drawings, in which:

Figs. 1 to 4 show a recording system according to the invention; and

Fig. 5 shows the proper arrangement of Figs. 1 to 4 to form the complete system.

Fig. 6 shows a sample record.

Figure 3:
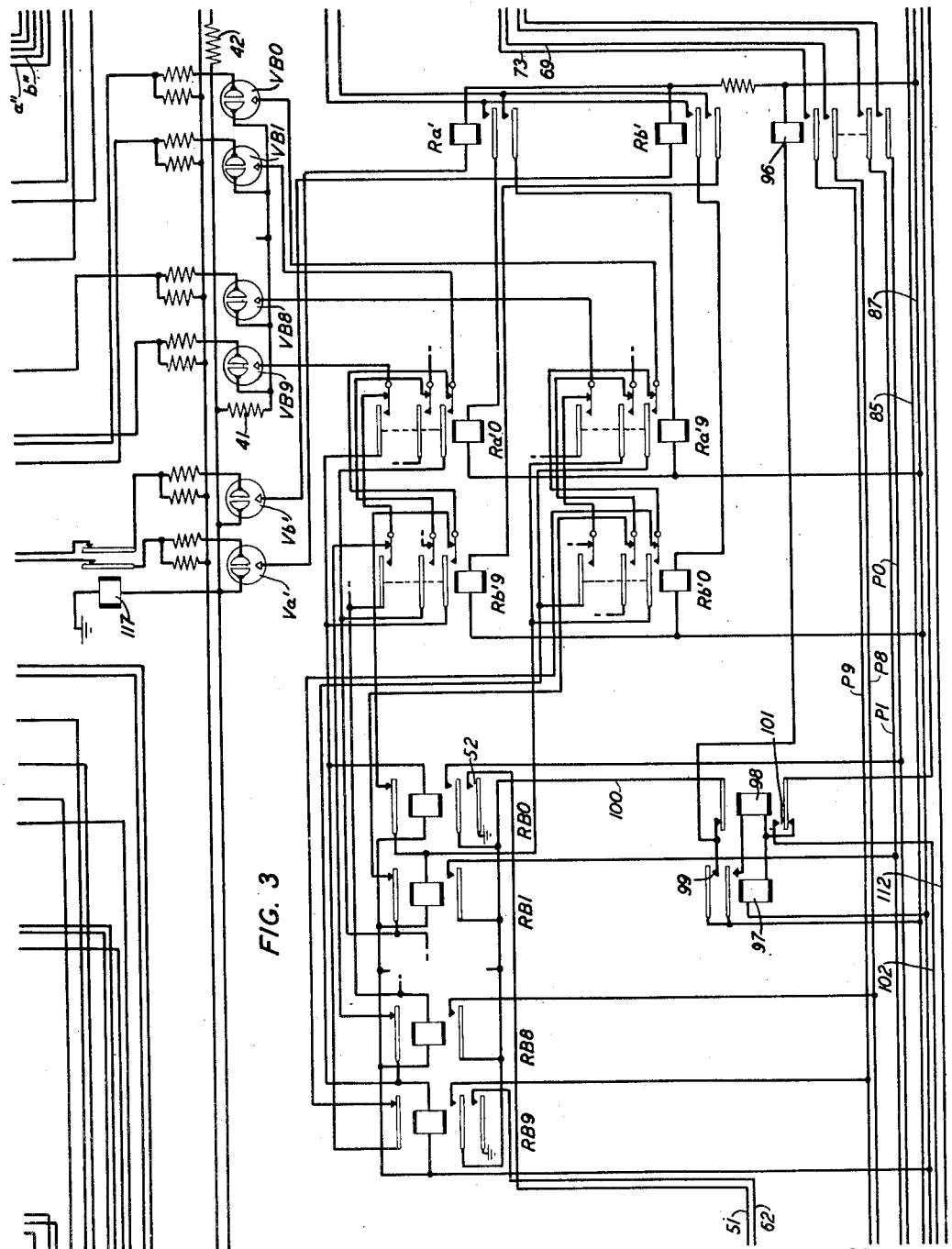

In the system shown to illustrate the invention, the remote mechanism 1 of Fig. 1 has a dial 2, the position of which it is required to record with great accuracy and at frequent intervals. The angular motion of the remote dial is multiplied at the recording position to the extent required for accurate measurement by means of a self-synchronizing system of the well-known type, such as disclosed for example in Patent 1,547,392 to Hewlett et al., July 28, 1925. The transmitter 3 of this system rotates with the dial 2 and the receiver 4 is maintained in proper angular relation to the transmitter by means of the amplifier 5 and motor 6 in the usual manner. The angular displacement of the shaft 7, therefore, may be made any desired multiple of the motion of the dial 2 which produced the displacement.

The shaft 7 drives the brush 8 of the distributor A and, through suitable reduction gearing, the brushes 10, 11 and 12 of the distributors B, D and C, respectively. In this particular system the printing mechanism 16 (Fig. 2) is adapted to record angular positions in degrees from 0 degree to 179.99 degrees or in angular mils from 0 to 1599.9. When recording in degrees the transfer switch 22 (Fig. 4) is in the position shown to connect distributor D to the tubes VCD0 to VD17 and distributors A, B and D are operative to control the printer. With the gear shift 9 (Fig. 1) in the degree position as shown, the brush 11 of distributor D makes one revolution for each half revolution of the dial 2. When recording in mils the transfer switch, the gear shift and the key 64 (Fig. 4) are operated to their "mil" positions, the distributors C, B and A are operative and the brush 12 of disteributor C makes one revolution for each quarter revolution (or 1600 angular mils) of the dial 2.

The distributors A and B have grounded inner rings 17 and 18, respectively, and a plurality of main segments surrounding the rings and successively grounded by the brushes as described more in detail below. The distributors D and C have similar rings 19 and 20 and the ring of whichever one of these distributors is in use is grounded by the contact 21 of the transfer switch 22.

The "mil" distributor C has sixteen main segments C0 to C15 corresponding to the first two numbers (00 to 15) of the "mil" readings and the "degree" distributor has eighteen segments D0 to D—17 corresponding to the first two numbers (00 to 17) of the degree readings. The distributor B has ten segments B0 to B9 for the third number of the reading (i. e., "units" when printing in mils and "tens" when printing in degrees). In each of the distributors A, B, C and D the small outer segments $a$ and $b$ are primers which will be discussed below.

The distributor A has two rows of main segments, the inner row comprising ten large segments A0 to A9 for the "tenths" of the degree readings (or the "units" of the mil readings) and the outer row comprising forty small segments ($a$, A.3, A.5, A.7, $b$) arranged in mulitpled groups of five to control the printing of the nearest odd hundredth of a degree or tenth of a mil. Primer segments $a$ and $b$ determine, as explained below, whether the nearest hundredth of a degree or tenth of a mil shall be 1 or 9.

Each main segment of each distributor is connected through a current limiting resistor with the cathode of a particular gas-filled trigger tube designated V followed by the associated drum letter and drum segment number. For example, tube VD17 is fired by the grounding of segment D17 of drum D, tubes VCD15 to VCD0 are fired by the grounding of the correspondingly numbered segment of drum C or D depending on whether the circuit is conditioned to record in mils or degrees; tubes VB9 to VB0 and VA9 to VA0 are fired by the grounding of the correspondingly numbered segment of drums B and A, respectively, and tubes VA$a$ to VA.3 are fired by the corresponding outer segments of drum A. To avoid unnecessary complication of the drawing many of the intermediate tubes of each group and their firing circuits which are not essential to an understanding of the system have been omitted.

The timing mechanism 23 (Fig. 4) for initiating the printing cycle comprises a shaft 24 driven by suitable mechanism 25 at a speed corresponding to the frequency of the printing cycle which in this case is once per second. The shaft has three cams 26, 27 and 28 for firing the "start" tube 29, the stop tube 30 and the "fifth second" tube 31. The latter tube is used to set off the readings in groups of five and since it operates only once in five seconds whereas the tubes 29 and 30 each operate once a second, it is convenient to drive the shaft 24 at one revolution in five seconds and provide each of the cams 26 and 27 with five lobes as indicated.

The tubes shown are all of the so-called cold cathode type each having three electrodes, namely, an anode, a cathode and a control anode. The tubes are fired by first applying to the control gap between the cathode and control anode a breakdown voltage to produce between these electrodes a discharge which in turn breaks down the main gap between the anode and one of the other electrodes. These other electrodes are sometimes both referred to as control electrodes and either can be considered the cathode or control anode depending on the external connections.

In this circuit, although the negative terminal of battery 35 is connected to the electrode on the left, it is in each case the electrode on the right (e. g., electrode 38 of tube 29) which is connected to ground. To avoid ambiguity in the following description the right-hand electrode is referred to as the cathode and the left-hand electrode as the control anode but it will be noted that when any tube, such as tube 29, is fired the main discharge path in tube 29, for example, is between the anode 36 and the left-hand or control anode 34.

Each of the tubes associated with a main segment of a distributor in firing normally completes an operating circuit for the correspondingly designated digit selecting relay. For example, tube VD17 (Fig. 4) normally operates relay RD17 and tube VCD0 normally operates relay RCD0. This normal operating circuit for each of these relays extends through back contacts of the next lower numbered relay of the same chain so that when one relay is operated it automatically disables the normal operating circuit of the next higher numbered relay.

When the brushes of all the distributors are contacting the mid-portion of a segment, these normal operating circuits can record the dial position correctly with little danger of error but when one brush is passing from a "nine" segment to a "zero" segment (or vice versa) the brush on the next higher distributor will be in an ambiguous position between two segments and the correct choice of digit to be printed will depend on whether the "nine" or the "zero" tube is fired.

Due to this fact, it is necessary to prime the selecting circuits so that each distributor will always operate the proper digit selecting relay even though at the instant the record is made the distributor brush may be in an ambiguous position.

*Priming circuits*

The distributors B, C and D are each provided with two sets of multipled primer segments, $a$ and $b$, respectively, which are disposed alternately around the main segments so as to be successively grounded by the distributor brushes when they are passing from one main segment to another.

When, at the instant a printing cycle is initiated, the brush of any of these three distributors is between main segments the grounded primer segment completes the firing path of one of the corresponding primer tubes (V$a$ or V$b$ (Fig. 4) for distributors C and D and V$a'$ or V$b'$ (Fig. 3) for distributor B). Tubes V$a$ and V$b$, for example, selectively operate relays R$a$ and R$b$ which in turn prepare operating circuits for the primer relays R$a_9$ and R$a_0$ or R$b_9$ and R$b_0$. If distributor B has operated the RB9 and RB0 relay to set up the digit 9 or 0 the operated one of these relays will selectively operate either the R$a$ or R$b$ pair of primer relays.

The operation of the primer relays changes the connections between the anode circuits of the tubes VD17 to VCD0 and the associated relays RD17 to RCD0 so as to insure the operation of the proper relay of this group even though the distributor C (or D) has fired a tube adjacent to the proper tube. When the *a* primer relays are operated, an even numbered tube fired in error will operate the next numbered relay if distributor B has selected 9 and an odd numbered tube fired in error will operate the next higher numbered relay if 0 has been selected. On the other hand, when the *b* primer relays are operated, an "even tube" will operate the next higher relay if 0 has been selected and an "odd tube" will operate the next lower relay if 9 has been selected.

Assume, for example, the brush arm 10 of distributor B to be approaching the B0 segment and firing the VB0 tube and the brush arm 11 of distributor D to be between segments D16 and D17. Then, for a correct reading, tube VD17 should fire to print 170 but assume that tube VD16 has fired in error.

Since the brush arm 11 is grounding a *b* primer segment at this time, tube V*b* has fired and operated relay R*b* which in turn has operated the relay R*b*0 over a circuit extending from the +50 volt terminal of battery 37, through the relay winding, contact 50 of relay R*b* and conductor 51 to the grounded contact 52 of the relay RB0 which was operated by the firing of tube VB0.

The operation of primer relay R*b*0 breaks contact 53 and makes contact 54 thereby transferring the control of relay RD17 to tube VD16 which then operates relay RD17 over a circuit extending from the grounded battery 35 through the main gap of the tube VD16, conductors 55, 56, 57 and the relay winding to the grounded battery 37. On the other hand, if the proper tube, namely, VD17, has fired, it will operate its corresponding relay RD17 over a circuit extending from the tube through conductor 58, the closed contacts of relays R*a*0, R*b*9, conductor 59, contact 60 of relay RD16 and the winding of relay RD17 to battery 37. In other words, the operation of the priming relay R*b*0 does not affect the normal operation of the circuit but merely assures the operation of the proper digit selecting relay by preparing a second operating circuit from the adjacent gas tube.

Similarly, if the conditions are as assumed above except that brush 11 of distributor D is between segments D15 and D16 (instead of D16 and D17) and tube VCD15 has fired in error, then brush 11 is in contact with an *a* primer segment and primer tube V*a* has fired to operate relays R*a* and R*a*0. These relays in operating transfer the control of relay RD16 to the tube VCD15 so that the latter relay is correctly operated just as if tube VCD16 had fired.

Assume on the other hand that when firing voltage is applied to the tubes, the brush arm 10 of distributor B is still on segment B9 and has fired tube VB9 which in turn has operated relay RB9. In this case relay RD16 should operate but with brush arm 11 of distributor D in the ambiguous position between segment D16 and D17, tube D17 may have fired in error. However, primer tube V*b* will have fired and operated relay R*b* which in turn operates relay R*b*9 over a circuit extending from the battery 37 through the relay winding, contact 61 of relay R*b*, conductor 62 to ground at relay RB9.

The operation of relay R*b*9 completes a circuit from battery 37 through the winding of relay RD16, conductor 63, transfer key 64, conductor 65, contacts 66 of relay R*b*9 and 67 of relay R*a*0, and conductor 58 to ground through the fired tube VD17. As before the operation of the primer relay R*b*9 does not affect the proper operation of relay RD16 in the event that tube VD16 has fired since in that case the operating circuit extends through contacts of the R*a*9 and R*b*0 relays and is independent of the R*b*9 relay.

The digit selecting relays RB9 to RB0 of Fig. 3 are similarly primed by means of primer segments of distributor B, the primer tubes V*a*', V*b*', the relays R*a*', R*b*' and the relays R*a*'0, R*a*'9, R*b*'0, R*b*'9 and since the operation of their associated circuits is the same as the operation of those just described, no detailed explanation of them is required.

The digit selecting relays RA9 to RA0 of Fig. 2 are primed in a somewhat similar manner but in this case the *a* and *b* segments of the distributor A (which correspond to the *a* and *b* segments, respectively, of the other distributors) and the associated tubes VA*a* and VA*b*, which control the printing of the lower order digits 1 and 9 from this distributor, are also used for priming purposes.

When the brush arm 8 of distributor A is in an ambiguous position between any two of the main segments A0 to A9, it is also grounding either an *a* or *b* segment and has therefore operated either the RA*a* or the RA*b* relay. Each of these relays has two contacts connected to the 1 and 9 segments of the printer 16 so that the operation of either relay will cause the figure 1 or 9 to be printed depending on the position of the brush 8 with respect to the main segments A0 to A9. For correct printing it will be seen that if the ambiguity in the brush position is resolved by firing the higher numbered tube of the series VA9 to VA0, then the primer relay (RA*a* or RA*b*) should cause 1 to be printed but if the lower numbered tube is fired the primer relay should cause 9 to be printed. It should be understood that in each series the 0 tube is considered a higher numbered tube than the 9 tube.

The primer circuits are therefore connected so that if tube VA*a* fires, relay RA*a* will print 1 if an even numbered relay of the series RA9 to RA0 is operated and will print 9 if an "odd" relay is operated. If tube VA*b* fires, relay RA*b* will print 1 if an "odd" relay is operated and will print 9 if an "even" relay is operated.

For example, assume brush 8 of distributor A to be between segments A8 and A9 and firing tube VA8 to operate RA8 to prepare to print the unit digit 8. Since the brush at this time is also grounding a *b* segment, tube VA*b* will have fired and operated relay RA*b*. The operation of relay RA8 closes contact 68 to prepare a circuit for printing the unit digit 8 by extending the conductor 69 from segment 8 of the printer to contact 70 of the "units" relay 71 as will be more fully explained in the description of the printing operation. The operation of relay RA*b* closes contact 72 to prepare a circuit for printing the "tenths" digit .9 by extending the conductor 73 from segment 9 of the printer through contact 74 of the operated "units" relay RA8 and conductors 75 and 76 to contact 77 of the "tenths" relay 78 which will be operated as described below to complete the circuit of the printing magnet 79 to ground.

Automatic lock-out of all other tubes of a group when first tube is fired

It will be noted the —95 volt connection from the battery 35 to the control anodes of the tubes includes a series resistor 40 for the group of tubes associated with the distributors C and D, a series resistor 41 for the tubes of distributor B and resistors 42 and 43 for the two groups of tubes of distributor A. When one tube in the group is fired, the resulting current immediately produces a large drop of potential in the corresponding resistor thereby automatically locking out all of the other tubes of the group by reducing the voltage between the control anodes and cathodes of the tubes below the value required to fire them.

The resistors are chosen to give a potential drop of about 30 volts but due to the effect of the inductance of the relay winding in retarding the build-up of current when a tube is fired, it is difficult with ordinary resistors to obtain the required potential drop quickly enough to avoid the possibility that a second tube may fire. These resistors are therefore of the "varistor" type composed of silicon carbide or some other similar material having a high initial resistance which decreases rapidly with increasing current. When using varistors, it is quite feasible for example to obtain more than 50 per cent of the required potential drop when the current has reached only 5 per cent of its final value.

Prevention of misfiring of tubes through leakage path

If the leakage resistance between the cathode and ground of a discharge tube becomes abnormally low, the tube may fire and to prevent this in the present circuit a resistance of about 0.1 megohm (such as 13 in the circuit of tube 38 of Fig. 4) is connected between the cathode lead and the common —95 volt supply lead from the battery 35 to the control anodes. In each case this resistance is relatively low as compared with the normal insulation resistance from the cathode of the corresponding tube to ground so that over any probable range of insulation resistance variations the potential drop in this added resistance due to leakage current will keep the control anode-cathode potential below the value required to fire the tube.

Tube exerciser circuit

When a gaseous discharge tube is inactive for a considerable period its firing time increases materially but is quickly restored to its original low value after a few firing operations. In this apparatus even this temporary increase in firing time may result in faulty recording at the beginning of an operating period. This is avoided by providing switching facilities such as the key 122 of Fig. 4 for "exercising" the tubes prior to the start of recording operations.

For normal operation, the key 122 is in the unoperated position as shown. When operated to exercise the tubes, the opening of contact 125 disconnects the battery 37 from the anode circuits of all of the tubes, the closing of contacts 123 and 14 grounds the cathodes of all of the tubes through the leakage current resistors (such as resistor 13 of tube 29) and the closing contact 124 applies firing potential from the battery 35, which is already connected to the start tube 29, to the control anodes of all the other tubes. The control gaps of all tubes are therefore broken down and under this condition the firing times of all the tubes are reduced to their normal low values in about two minutes. The key 122 may then be released and the system is ready for use.

Operation

The system is shown in condition for printing the successive instantaneous positions of the dial 2 in degrees with the lobe 32 of the cam 26, Fig. 4, about to close the contact 33.

When the cathode 38 of the start tube 29 is grounded at contact 33 the control gap between the cathode and the control anode 34 breaks down due to the potential applied between these electrodes by the battery 35. Since at this time the control anode is at —95 volts with respect to ground and the anode 36 is at +50 volts with respect to ground due to the connection to the battery 37, the tube fires and operates the relay 39 over a circuit extending from the grounded battery 37 through the relay winding, the contact of relay 109, the main gap of the tube to the grounded battery 35. The operation of relay 39 extends the —95 volt connection to the control anodes of all the tubes associated with the distributor segments and also operates relays 116 and 117 to disconnect the cathodes of the primer tubes Va, Vb and Va', Vb' from the primer segments so that each pair of tubes is disabled soon after the proper priming tube has fired. This is done to prevent the firing of both tubes of each pair before the selected primer relay has operated.

At this instant one main segment of each of the distributors A, B and D will be grounded through the distributor brush thereby completing the firing circuits of the corresponding gas tubes. The firing of these tubes completes the operating circuits of the corresponding digit selecting relays associated with these tubes.

For example, the firing of tube VCD0 normally operates relay RCD0 over a circuit extending from the positive terminal of the grounded battery 37, through the relay winding, conductor 44, contact 45 of relay RD17, the transfer key 64, conductor 46, the contacts of primer relays Rb0 and Ra9, the main discharge path of the tube VCD0, resistor 40 and the contacts of relay 39 to the grounded battery 35. Similar operating paths may be traced for any other relay of this group or of the groups associated with the drums A or B.

The operating circuits of each group of the digit selecting relays are connected in a chain so that the operation of one relay disables the circuit of the next higher numbered relay with the result that only one relay of each group can be held operated during any one printing cycle. For example, the operation of RCD0 opens contact 47 in the normal operating circuit of relay RCD1, the operation of RCD1 opens contact 48 in the circuit of RCD2, etc. and the operation of RD17 in turn opens contact 45 which disables relay RCD0.

The printing operation

The printer 16 (Fig. 2) which may be of the type shown in detail in Patent 2,309,688 to Zenner, consists essentially of a motor 80 driving a print wheel 81 mounted in printing relation with respect to a tape 82 and a brush arm 83 which sweeps over a distributor 90 to connect the printing magnet 79 to the various segments corresponding to the digits to be printed. A facsimile of a typical recording made on tape 82 is shown in Fig. 6.

When the start tube 29 has fired to operate relay 39 and the particular combination of digit selecting relays representing the instantaneous position of the dial 2 in the manner already described, the corresponding digits are recorded by the printer as follows:

The operation of relay 39 operates relay 84 over a circuit extending from the grounded battery 35 through the contact of relay 39, through contact 124, through the relay to ground. The operation of relay 84 grounds conductor 85 to complete for the "dash" relay 86 (Fig. 2) a circuit extending from the battery 37 over conductor 87 through the relay, the back contacts of the "dash" relay 88 the contact of the printing magnet 79 and conductor 85 to ground at relay 84. Relay 86, in operating, locks up through the winding of relay 88 and extends the grounded conductor 85 through the upper back contact 89 of relay 88 to the "dash" segments of the printer distributor 90.

When the brush 83 contacts the first of these grounded segments, the printing magnet is operated to print on the tape 82 a dash which separates the succeeding digits from the readings previously printed. The operation of the magnet 79 opens the ground connection to the winding of relay 88 which then operates and locks up with the relay 86. Relay 88 in operating disconnects the dash segments from ground, releases the printing magnet and closes contact 91 to extend the printer ground connection to the first digit relays 78 and 92. These relays then operate in the manner just described for relays 86 and 88.

The operation of relay 78 extends the ground connection from conductor 85 through conductor 76 to the upper contacts of the relay group RAa to RA.3 and the relay group RA9 to RA0. If either relay RAa or RAb of that group is operated, the ground connection will be extended through the contacts of the RA9 to RA0 relays to ground either the "nine" segment or the "one" segment of the printer depending on whether an even or an odd numbered relay of the group RA9 to RA0 has been operated as more fully described above in connection with the priming circuits. The printer will therefore print 1 or 9 as the second digit of the dial reading depending on which of these numbers more accurately represents the position of the dial. If, on the other hand, neither relay RAa or RAb is operated but some other relay of this group such as RA.7 is operated the ground connection from conductor 76 will be extended directly (that is, independently of the relays RA9 to RA0) to the 7 segment of the printer through the upper contacts of relays RAa and RAb and the inner, upper contact of the relay RA.7.

The operation of relay 92 further extends the ground connection through contact 93 to the units relays 71 and 94. The operation of relay 71 extends the ground connection from conductor 85 through contact 70 and conductor 95 to the armature of the unit relays RA9 to RA0 and through the operated one of these relays to the correspondingly numbered segment of the printer. The brush arm 83 in sweeping over this segment operates the printing magnet to print the proper second digit on the tape.

It will be noted that the digit selecting relays RD17 to RCD0 (Fig. 4) and RB9 to RB0 (Fig. 3) are all isolated from the conductors associated with the segments of the printer distributor 90 at the open contacts of relay 96 (Fig. 3). Since relay 96 (Fig. 3) is not yet operated, the printing operations thus far described may occur before the switching necessary to determine the higher order digits has been completed.

This isolating relay is used as a further precaution against faulty recording. While, as explained above, only one relay of the group RD17 to RCD0 can be held operated, it is possible that, with the distributor brush arm between two segments of the distributor, two adjacent tubes may fire simultaneously to operate the two corresponding relays. In this case, the higher numbered relay will immediately release since its operating circuit extends through back contacts on the other operated relay. However, since the relays of this group each control the printing of two digits, two of the conductors P0 to P9, which lead to the correspondingly numbered printer segments, will be connected together through the relay contacts during the time that two of the relays are operated. If these conductors were connected through to the printer at that time there would be a possibility of an error in printing but by carrying these conductors through contacts on the relay 96 they remain isolated from the printer until the circuits have stabilized. However, when relay 94 operates (as explained for relay 88) the printer ground is extended to the third digit relays 97 and 98 and the operation of relay 97 closes contact 99 to complete the operating circuit of relay 96 and locks it up with relay 97. The operation of relay 96 extends the conductors from the printer segments to the digit selecting relays controlled by the B and D distributors.

Relay 97 in operating connects the grounded conductor 85 through conductor 100 to the armatures of the relays RB9 to RB0 and the operated relay of this group grounds the correspondingly numbered segment of the printer through the contacts of relay 96 to cause the printing of the third digit.

The operation of relay 98 closes contact 101 to extend the printer ground over conductor 102 to the fourth digit relays 103, 104. Relay 103 in operating extends the grounded conductor 85 to the outer, lower armatures of relays RD17 to RCD0. If, for example, relay RCD0 of this group is operated, the zero segment of the printer is grounded and "zero" will be printed as the fourth digit.

Relay 104 in operating extends the printer ground to the fifth digit relays 105 and 106 and relay 105 in operating connects the grounded conductor 85 to the inner, lower armatures of relays RD17 to RCD0. Since RCD0 is assumed operated, the zero segment of the printer is again grounded and "zero" is printed as the fifth and final digit of the reading.

All of the foregoing operations normally are completed in less than .95 second from the time the start tube 29 was fired. The rotation of shaft 24 (Fig. 4) then causes the lobe 107 of the cam 27 to close contact 108 to fire the "stop" tube 30. The current through this tube operates relay 109 to reset the start tube 29 and release relay 39 which in releasing disconnects the battery 35 from all of the gas tubes associated with the several distributors and from the relays 116 and 117 thereby resetting them in preparation for the next printing cycle. In releasing, relay 39 also releases relay 84 thereby disconnecting the conductor 85 from ground, releasing the whole chain of "dash" and "digit" relays which were successively locked up over this conductor in the printing operations and completing the restoration of the circuit to its original condition.

It will be noted that only a very small margin, such as .05 second, is allowed for variations in the time required to select and print the proper combination of digits. This is made possible by printing the lower order numbers first so that in the event that the stop tube fires before the last digit has been printed the missing figure may be determined by inspection of the adjacent readings.

This printing cycle will then be repeated once every second but it will be noted that every fifth second the lobe 110 of cam 28 will close contact 111 to fire the tube 31 at the same time as the start tube 29 is fired. This will ground conductor 112 and operate relay 113 (Fig. 2) thereby connecting the "second dash" relays 114 and 115 into the chain of printer relays between the "dash" and "first digit" relays. The operation of relays 114 and 115 which is similar to the operation of relays 86 and 88, will result in printing two dashes before the dial reading thereby automatically separating the readings into groups of five to simplify the identification of a particular reading of interest.

*Printing in mils*

When recording in angular mils the readings cover only a 1600-mil range or 90 degrees whereas when recording in degrees the range extends over 180 degrees. It is, therefore, necessary when recording in mils to operate the lever 9 (Fig. 1), change the gear ratio between the shaft 7 and the shaft of the receiver 4. The operation of the transfer switch 22 disconnects the primer tubes Va, Vb and the selecting tubes VD17 to VCD6 from the degree distributor D and connects them to the mil distributor C. Due to the difference in the number of segments on these distributors it is necessary when using the mil distributor to shorten the relay chain by eliminating relays RD17 and RD16.

This is readily accomplished without affecting the mode of operation by operating the key 64. This key disconnects conductor 46 from conductor 120 and connects it to conductor 121 to carry the normal operating circuit of relay RCD6 through the back contact of relay RCD15 instead of relay RCD17; disconnects conductor 65 from conductor 63 and connects it to conductor 44 so that, when the primer relay Ra6 is operated, tube VCD15 controls the relay RCD6 instead of RD16; and disconnects conductor 118 from conductor 57 and connects it to conductor 119 so that, when the primer relay Ra9 is operated, tube VCD6 controls relays RCD15 instead of RCD17.

With these circuit changes the system operates in the manner already described to register the dial positions in angular mils.

What is claimed is:

1. A system for recording the successive instantaneous positions of a remote rotating member comprising a shaft, control means responsive to the rotating member for imparting to said shaft a rotary motion corresponding to some multiple greater than unity of the motion of said rotating member, a plurality of distributor switching mechanisms each of which comprises a rotating wiper arm, means for coupling said wiper arms to said shaft to rotate said arms at different fixed speed ratios with respect to the motion of said shaft, spaced segments on said distributor switching mechanisms wiped by said arms, said segments positioned to represent the angular positions of said rotating member, a source of firing potential, means for connecting those of said segments which represent an instantaneous angular position of said rotating member to one side of said source of potential, gas tubes, means individually connecting each segment of said distributor mechanisms to one of said tubes, means connecting the other side of said potential source to each of said tubes, digit selecting relays, means for individually connecting each of said tubes to one of said relays, a device for recording the instantaneous position of said rotating member, a timing mechanism, means controlled thereby for periodically applying the same firing potential to each of the gas tubes simultaneously to operate the gas tubes connected to the segments representing an instantaneous angular position of said rotating member and thereby actuate the digit selecting relays connected to said tubes, means for operating said recording device under the control of said digit selecting relays, and means controlled by said timing mechanism for automatically resetting the tubes and relays to respond to succeeding applications of firing potential.

2. A system for recording the successive instantaneous positions of a remote rotating member comprising a shaft, control means responsive to the rotating member for imparting to said shaft a rotary motion corresponding to some multiple greater than unity of the motion of said rotating member, a plurality of distributor switching mechanisms each of which comprises a rotating wiper arm, means for coupling said wiper arms to said shaft to rotate said arms at different fixed speed ratios with respect to the motion of said shaft, alternately spaced main and primer segments on said distributor switching mechanisms wiped by said arms, said segments positioned to represent the angular positions of said rotating member, a source of firing potential, means for connecting those of said segments which represent an instantaneous angular position of said rotating member to one side of said source of potential, a separate group of gas tubes and relays for each distributor mechanism and operatively controlled thereby, means individually connecting each main segment of a distributor mechanism to a tube in the group of tubes for said distributor mechanism, means connecting each primer segment of said distributor mechanism to one of two other tubes in said group, means connecting the other side of said potential source to each gas tube in each group, digit selecting relays in each group operatively controlled by the tubes connected to said main segments, a normal operating circuit for each of the digit selecting relays in a group for operating each of said relays under the individual control of a particular tube in said group, means for transferring the control effect of said particular tube to one of two other digit selecting relays in said group to operate said other relay, said means comprising selectively operable priming relays for selectively connecting one of said other digit selecting relays to said particular tube, and means controlled by one of two tubes in said group connected to a primer segment and by one of two digit selecting relays in another group for selectively operating said priming relays, a device for recording the instantaneous position of said rotating member, means for periodically applying the same firing potential to each of the gas tubes simultaneously to operate the gas tubes connected to the segments representing an instantaneous angular position of said rotating member and thereby actuate the digit selecting relays under the control of said tubes, and means for operating said recording device under the control of said digit selecting relays.

3. A system according to claim 2 having a distributor switching mechanism the segments of which include a group of segments operatively connected to gas tubes and relays for interpolating between the digits selected by the digit selecting relays, means for recording each of a plurality of figures in a series under the individual control of one of said interpolating relays, and means for recording the lowest and highest figures in said series under the control of one of two of said interpolating relays and the actuated digit selecting relay.

4. In a system according to claim 2, timing mechanism for controlling the periodic application of firing potential to the gas tubes, and means controlled by said timing mechanism for automatically resetting the tubes and relays to respond to succeeding applications of firing potential.

5. In a system according to claim 2, means responsive to current in any tube of a group for disabling all the other tubes of said group.

6. A system according to claim 2 having manually operable means for firing and resetting all of the tubes simultaneously at will to restore them to uniform high sensitivity after a period of inactivity.

7. A system according to claim 2 having a separate connection to the source of firing potential from each group of gas tubes, and an element in each connection having a high initial resistance which decreases with increasing current for reducing the voltage applied from said source to the other tubes in the group upon the firing of one of the tubes in said group.

FERDINAND S. ENTZ.
GEORGE A. PULLIS.
GEORGE R. STIBITZ.

REFERENCES CITED

The following references are of record in the file of this patent:

UNITED STATES PATENTS

| Number | Name | Date |
| --- | --- | --- |
| 1,677,000 | Moore | July 20, 1928 |
| 2,091,533 | Swart | Aug. 31, 1937 |
| 2,093,854 | Swart | Sept. 21, 1937 |
| 2,098,227 | Chauveau | Nov. 9, 1937 |
| 2,259,451 | Bennett | Oct. 21, 1941 |
| 2,314,719 | Leathers | Mar. 23, 1943 |
| 2,319,412 | Leathers | May 18, 1943 |